US012657466B2

(12) United States Patent
Rama et al.

(10) Patent No.: US 12,657,466 B2
(45) Date of Patent: Jun. 16, 2026

(54) TRANSFER-LEARNING FOR STRUCTURED DATA WITH REGARD TO JOURNEYS DEFINED BY SETS OF ACTIONS

(71) Applicant: Microsoft Technology Licensing, LLC, Redmond, WA (US)

(72) Inventors: Kiran Rama, Bangalore (IN); Ke Li, Redmond, WA (US); Sharath Kumar Rangappa, Bangalore (IN); Shariq Ahmad, Kolkata (IN); Akash Kodibail, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 664 days.

(21) Appl. No.: 17/958,261

(22) Filed: Sep. 30, 2022

(65) Prior Publication Data

US 2024/0112032 A1    Apr. 4, 2024

(51) Int. Cl.
| | |
|---|---|
| G06N 3/0495 | (2023.01) |
| G06F 17/16 | (2006.01) |
| G06F 18/22 | (2023.01) |
| G06N 3/045 | (2023.01) |
| G06N 3/0499 | (2023.01) |
| G06N 3/08 | (2023.01) |
| G06N 3/082 | (2023.01) |

(52) U.S. Cl.
CPC ............. G06N 3/082 (2013.01); G06F 18/22 (2023.01); G06N 3/045 (2023.01)

(58) Field of Classification Search
CPC ......... G06N 3/082; G06N 3/045; G06F 18/22
See application file for complete search history.

(56) References Cited

U.S. PATENT DOCUMENTS

| | | |
|---|---|---|
| 2009/0276379 A1 | 11/2009 | Tzoref |
| 2011/0264513 A1 | 10/2011 | Ratnaparkhi |
| 2013/0124298 A1 | 5/2013 | Li et al. |
| 2015/0186938 A1 | 7/2015 | Zhang |

(Continued)

FOREIGN PATENT DOCUMENTS

WO          2021080577 A1      4/2021

OTHER PUBLICATIONS

Non-Final Office Action mailed on Mar. 3, 2025, in U.S. Appl. No. 17/960,618, 20 pages.

(Continued)

*Primary Examiner* — Brandon S Cole
(74) *Attorney, Agent, or Firm* — Wade IP Law PLLC

(57) ABSTRACT

Techniques are described herein that are capable of performing transfer-learning for structured data with regard to journeys defined by sets of actions. A first deep neural network (DNN) for a first journey is trained using structured data. Weights of nodes in the first DNN are transferred to nodes in a second DNN for a second journey using transfer-learning. An embedding layer replaces a final layer of the first DNN in the second DNN to provide an output with a same number of nodes as a pre-final layer of the first DNN. Weights of the nodes in the embedding layer are initialized based at least on a probability that a new feature of the second journey co-occurs with each feature in the structured data. A softmax function is applied on a final layer of the second DNN to indicate possible next actions of the second journey.

20 Claims, 6 Drawing Sheets

(56) References Cited

U.S. PATENT DOCUMENTS

| | | | |
|---|---|---|---|
| 2017/0330231 A1 | 11/2017 | Wayne | |
| 2019/0102681 A1 | 4/2019 | Roberts et al. | |
| 2019/0108444 A1* | 4/2019 | Song | G06N 3/082 |
| 2019/0251468 A1 | 8/2019 | Guillame-bert et al. | |
| 2019/0278378 A1* | 9/2019 | Yan | G06N 3/0442 |
| 2019/0286984 A1* | 9/2019 | Vasudevan | G06N 3/045 |
| 2020/0117906 A1* | 4/2020 | Lee | G06V 10/764 |
| 2021/0073672 A1 | 3/2021 | Shi et al. | |
| 2021/0216923 A1 | 7/2021 | Rama | |
| 2021/0224862 A1 | 7/2021 | Taifi et al. | |
| 2021/0256309 A1 | 8/2021 | Huth et al. | |
| 2022/0171873 A1 | 6/2022 | Lundbæk | |
| 2022/0171874 A1 | 6/2022 | Lundbæk | |
| 2022/0391778 A1 | 12/2022 | Green | |
| 2023/0205915 A1 | 6/2023 | Wang | |
| 2023/0274183 A1 | 8/2023 | Mauser | |
| 2024/0054391 A1 | 2/2024 | Guha Thakurta | |
| 2024/0070475 A1 | 2/2024 | Huang | |
| 2024/0119484 A1 | 4/2024 | Rama | |
| 2024/0126794 A1* | 4/2024 | Cook | H04L 51/02 |

OTHER PUBLICATIONS

International Preliminary Report on Patentability received for PCT Application No. PCT/US23/031352, mailed on Apr. 17, 2025, 13 pages.
International Preliminary Report on Patentability received for PCT Application No. PCT/US23/031094, Apr. 10, 2025, 11 pages.
Ganin, et al., "Unsupervised Domain Adaptation by Backpropagation", In International conference on machine learning, Jul. 6, 2015, 12 Pages.
International Search Report and Written Opinion received for PCT Application No. PCT/US2023/031094, Nov. 9, 2023, 16 pages.
Li, et al., "FairSR: Fairness-aware Sequential Recommendation through Multi-Task Learning with Preference Graph Embeddings.", Arxiv.org, Cornell University Library, 201 Olin Library Cornell University, Ithaca, Ny, Apr. 30, 2022, 21 Pages.
Li, et al., "Prior-Guided Transfer Learning for Enhancing Item Representation in E-commerce.", In Proceedings of the AAAI Conference on Artificial Intelligence, vol. 36, No. 11, Feb. 22, 2022, pp. 12387-12395.
"*Recentive Analytics, Inc.* v. *Fox Corp*", Court Decision by Federal Circuit, Case No. 2023-2437, Apr. 18, 2025, 18 Pages.
Final Office Action mailed on Jun. 24, 2025, in U.S. Appl. No. 17/960,618, 24 pages.
"Semi-Supervised Learning in Scikit Learn", Retrieved from URL: https://web.archive.org/web/20220429081130/https://scikitleam.org/stable/modules/semi_supervised.html, Apr. 29, 2022, 2 Pages.
"The Interactive Tree Builder", Retrieved from: https://www.ibm.com/doc,s/en/spss-modeler/18.1.1?topic=treesnteractive-tree-builder, Mar. 8, 2021, 3 Pages.

Brownlee, Jason, "Semi-Supervised Learning with Label Propagation", Retrieved from URL: https://machinelearningmastery.com/semi-supervised-learning-with-label-propagation/, Dec. 30, 2020, 19 Pages.
Chai, Wesley, "Fuzzy Logic", Retrieved from: https://www.techtarget.com/searchenterpriseai/definition/fuzzy-logic#:-:text=Fuzzy%2Ologic%20is%20an%20approach,at%20Berkeley%20in%20the%201960s., Jun. 2021, 3 Pages.
Final Office Action mailed on Aug. 15, 2024, in U.S. Appl. No. 17/960,618, 19 pages.
Garofalakis, et al., "Building Decision Trees with Constraints", In Data Mining and Knowledge Discovery, vol. 7, No. 2, Apr. 2003, pp. 187-214.
Guillemot, Agathe, "Interactive decision tree builder", Retrieved from: https://www.dataiku.com/product/plugins/decision-tree-builder/, Nov. 21, 2019, 12 pages.
International Search Report and Written Opinion received for PCT Application No. PCT/US23/031352, mailed on Nov. 3, 2023, 18 pages.
Non-Final Office Action mailed on Mar. 28, 2024, in U.S. Appl. No. 17/960,618, 17 pages.
Sanchez-Roger, et al., "Fuzzy logic and its uses in finance: a systematic review exploring its potential to deal with banking crises", In Journal of Mathematics, vol. 07, Issue 11, Nov. 11, 2019, 22 Pages.
Singh, et al., "Comparative Study Id3, Cart and C4.5 Decision Tree Algorithm: A Survey", In International Journal of Advanced Information Science and Technology, vol. 27, No. 27, Jul. 2014, pp. 97-103.
Verhaeghe, et al., "Learning optimal decision trees using constraint programming", In Journal of Constraints, vol. 25, No. 3, Oct. 29, 2020, pp. 226-250.
What is an Expert System?, Retrieved from: https://web.archive.org/web/20220309132719/https://www.javatpoint.com/expert-systems-in-artificial-intelligence, Mar. 9, 2022, 10 Pages.
What Is Fuzzy Logic? I Fuzzy Logic, Part 1, Retrieved from: https://www.youtube.com/watch?v= OnZuG4sTw, Aug. 25, 2021, 4 Pages.
Diaz-Garcia, et al., "Multivariate stratified sampling by stochastic multiobjective optimisation", arXiv:1106.0773v1, Jun. 3, 2011, 23 pages.
Non-Final Office Action mailed on Nov. 28, 2025, in U.S. Appl. No. 17/899,504, 26 pages.
Non-Final Office Action mailed on Dec. 8, 2025, in U.S. Appl. No. 17/960,618, 22 pages.
Notice of Allowance mailed on Apr. 13, 2026, in U.S. Appl. No. 17/899,504, 11 pages.
Final Office Action mailed on Apr. 28, 2026, in U.S. Appl. No. 17/960,618, 24 Pages.

* cited by examiner

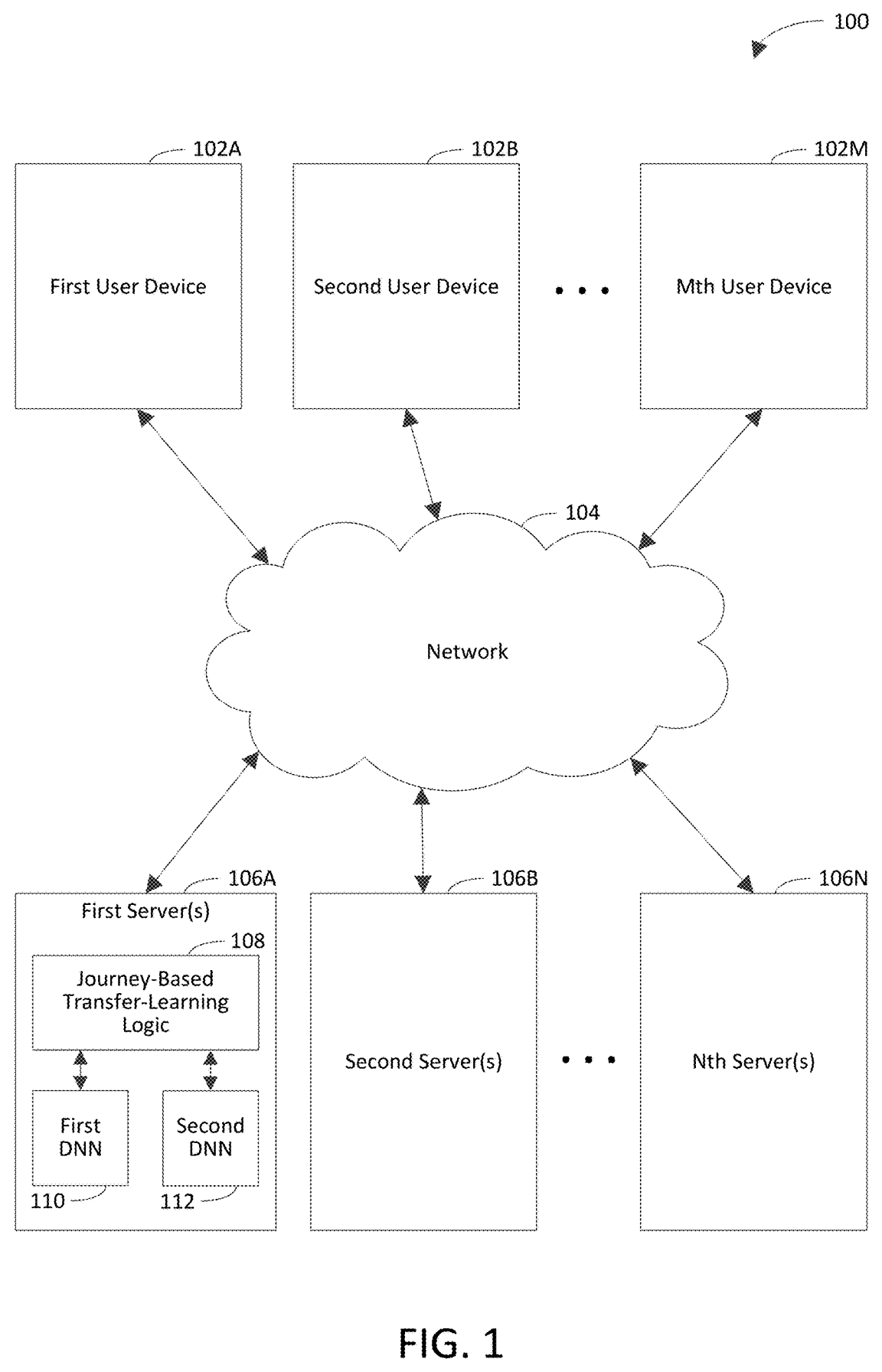

100

102A

First User Device

102B

Second User Device

• • •

102M

Mth User Device

104

Network

106A

First Server(s)

108

Journey-Based
Transfer-Learning
Logic

First
DNN

Second
DNN

110

112

106B

Second Server(s)

• • •

106N

Nth Server(s)

FIG. 1

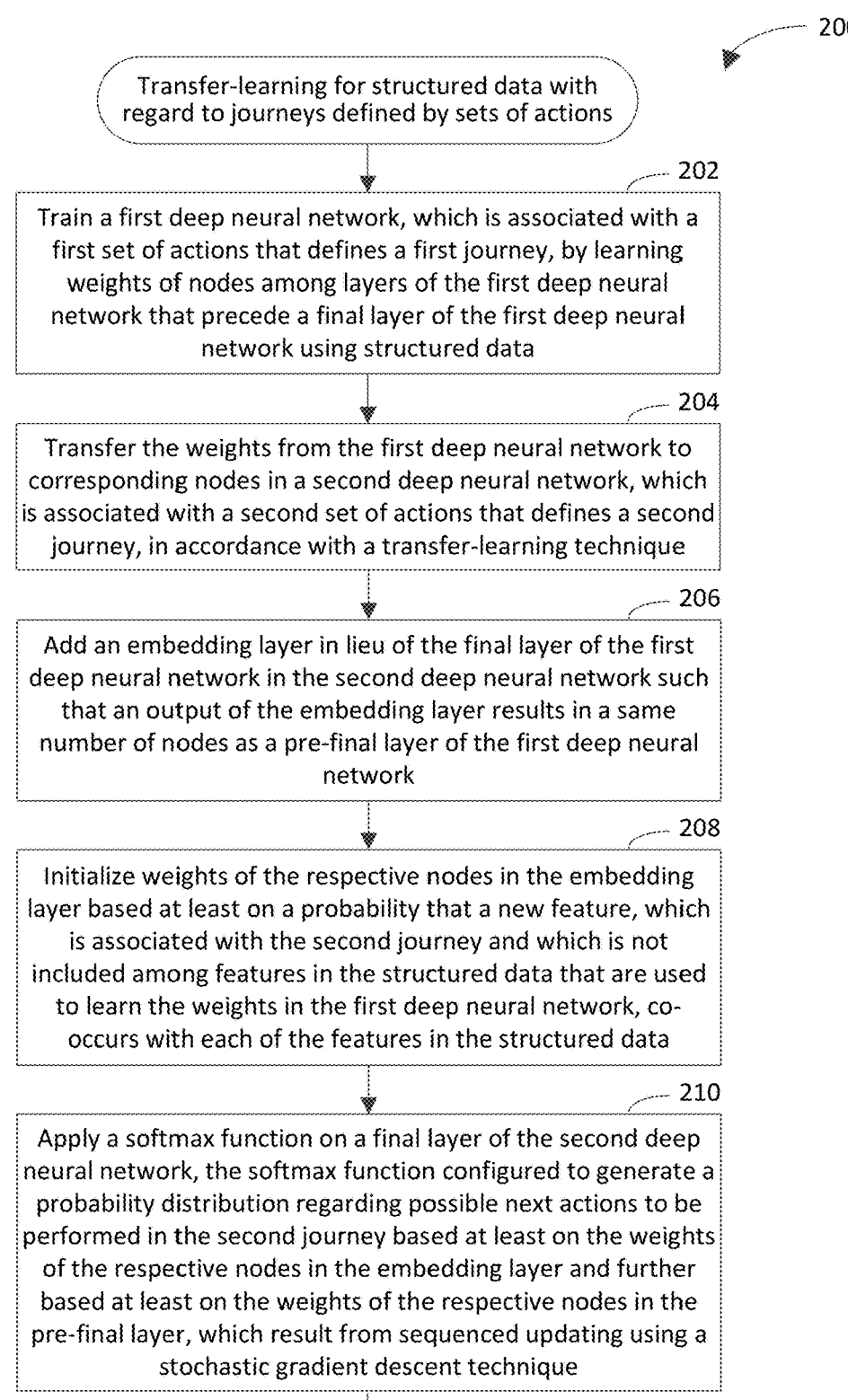

200

Transfer-learning for structured data with regard to journeys defined by sets of actions

— 202

Train a first deep neural network, which is associated with a first set of actions that defines a first journey, by learning weights of nodes among layers of the first deep neural network that precede a final layer of the first deep neural network using structured data

— 204

Transfer the weights from the first deep neural network to corresponding nodes in a second deep neural network, which is associated with a second set of actions that defines a second journey, in accordance with a transfer-learning technique

— 206

Add an embedding layer in lieu of the final layer of the first deep neural network in the second deep neural network such that an output of the embedding layer results in a same number of nodes as a pre-final layer of the first deep neural network

— 208

Initialize weights of the respective nodes in the embedding layer based at least on a probability that a new feature, which is associated with the second journey and which is not included among features in the structured data that are used to learn the weights in the first deep neural network, co-occurs with each of the features in the structured data

— 210

Apply a softmax function on a final layer of the second deep neural network, the softmax function configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique End

FIG. 2

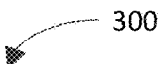
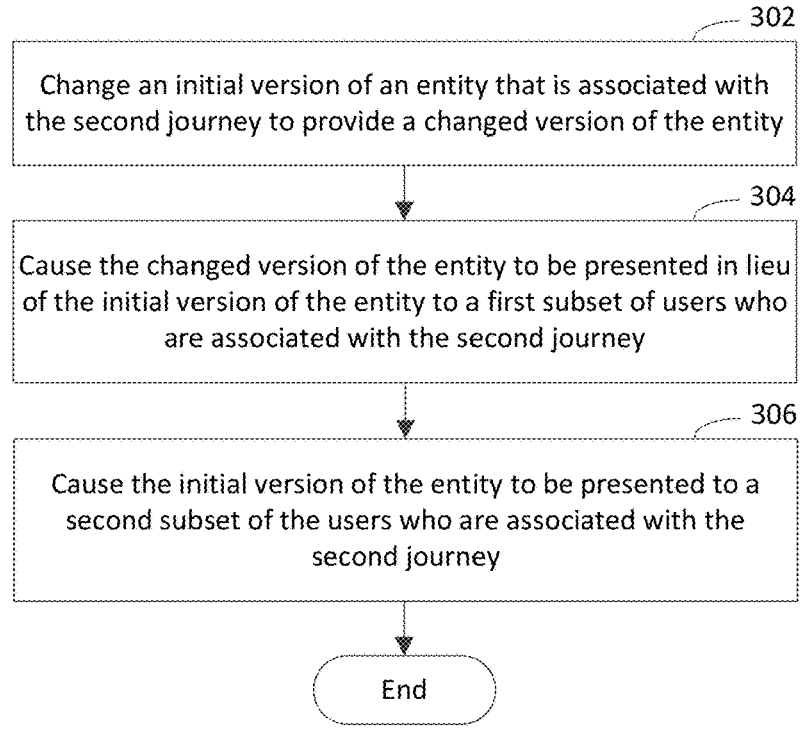
FIG. 3

TRANSFER-LEARNING FOR STRUCTURED DATA WITH REGARD TO JOURNEYS DEFINED BY SETS OF ACTIONS

BACKGROUND

A journey is a set of actions that are performed to achieve a goal (e.g., resolve an issue) with regard to an entity. For instance, the actions of a journey often are performed in a business context to achieve a business objective. A deep neural network often is used to determine a next action (e.g., next best action) to be performed in a journey. For instance, the next action may be the action that the deep neural network deems most likely to facilitate achieving the goal of the journey. A deep neural network is an artificial neural network that includes multiple layers between an input layer and an output layer. An artificial neural network is a system that is inspired by a biological neural network of an animal brain. For instance, an artificial neural network may increase accuracy, precision, and/or efficiency with which the artificial neural network achieves a goal by considering examples. Each example may include sample inputs and sample output(s) that result from the sample inputs. A configuration of a deep neural network typically is specific to the journey with which the deep neural network is associated. Accordingly, a new deep neural network often is constructed from scratch for each new journey. Generating a new deep neural network from scratch for each new journey typically consumes a substantial amount of time and resources, especially if an amount of data regarding the new journey is limited (e.g., non-existent).

SUMMARY

A first deep neural network associated with a first journey can be used to construct a second deep neural network associated with a second journey based at least on a similarity between the first and second journeys. Examples of a journey include but are not limited to a digital buyer journey, an engineering support journey, a journey of a compute system (e.g., virtualized storage or virtualized network) over time, and a journey of a software product over time. In an example digital buyer journey, a user visits a website to make a purchase, and a deep neural network determines the next content to be provided to the user to facilitate the purchase. In an example engineering support journey, a user submits an engineering support ticket that identifies an issue, and a deep neural network determines the next document (e.g., article) to be provided to the user to facilitate resolving the issue. In an example journey of a compute system or a software product, a deep neural network determines a next action (e.g., maintenance action, upgrade action, or reconfiguration) to be performed with regard to the compute system or the software product. For instance, in the example journey of the compute system, the next action may include replacing a failing hard drive or upgrading or updating a software system or a RAID configuration.

Transfer-learning can be used to construct the second deep neural network based at least on the first deep neural network, even though one or more features associated with the second journey are not included in structured data that are used to train the first deep neural network. Transfer-learning is a process of applying knowledge, which is learned with regard to solving a first problem, to solve a second problem that is different from but related to the first problem. For instance, information regarding a first journey that pertains to a first entity may be used to perform a second journey that pertains to a second entity based at least on a similarity between the first and second journeys. Examples of an entity include but are not limited to a compute system, a software product, and a website. Structured data is data that has a defined structure. For example, the structured data may be organized into rows and columns. In accordance with this example, the rows and columns constitute the defined structure.

For example, nodes and corresponding weights in each layer of the first deep neural network that precedes the final layer (a.k.a. last layer or last used layer) may be incorporated into the second deep neural network using a transfer-learning technique. An embedding layer having the same number of nodes as the pre-final layer of the first deep neural network may be incorporated into the second deep neural network in lieu of the final layer of the first deep neural network. A pre-final layer (a.k.a. next-to-last layer) of a deep neural network is the layer that immediately precedes the final layer of the deep neural network. Weights of the nodes in the embedding layer may be established by taking into consideration the feature(s) not included in the structured data. A softmax function may be applied on a final layer of the second deep neural network based at least on the weights of nodes in the embedding layer and the pre-final layer. By using the first deep neural network to construct the second deep neural network in accordance with any one or more of the example techniques described herein, an amount of time and/or resources associated with constructing the second deep neural network is reduced.

Various approaches are described herein for, among other things, performing transfer-learning for structured data with regard to journeys defined by sets of actions. In an example approach, a first deep neural network, which is associated with a first set of actions that defines a first journey, is trained by learning weights of nodes among layers of the first deep neural network that precede a final layer of the first deep neural network using structured data. The weights are transferred from the first deep neural network to corresponding nodes in a second deep neural network, which is associated with a second set of actions that defines a second journey, in accordance with a transfer-learning technique based at least on a similarity between the first set of actions and the second set of actions satisfying a similarity criterion. An embedding layer is added in lieu of the final layer of the first deep neural network in the second deep neural network such that an output of the embedding layer results in a same number of nodes as a pre-final layer of the first deep neural network. Weights of the respective nodes in the embedding layer are initialized based at least on a probability that a new feature co-occurs with each of the features in the structured data. The new feature is associated with the second journey and is not included among the features in the structured data that are used to learn the weights in the first deep neural network. A softmax function is applied on a final layer of the second deep neural network. The softmax function is configured to generate a probability distribution regarding possible next actions to be performed in the second journey based at least on the weights of the respective nodes in the embedding layer and further based at least on the weights of the respective nodes in the pre-final layer. The weights of the respective nodes in the pre-final layer result from sequenced updating using a stochastic gradient descent technique.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example journey-based transfer-learning system in accordance with an embodiment.

FIGS. 2-3 depict flowcharts of example methods for performing transfer-learning for structured data with regard to journeys defined by sets of actions in accordance with embodiments.

Figure 4:
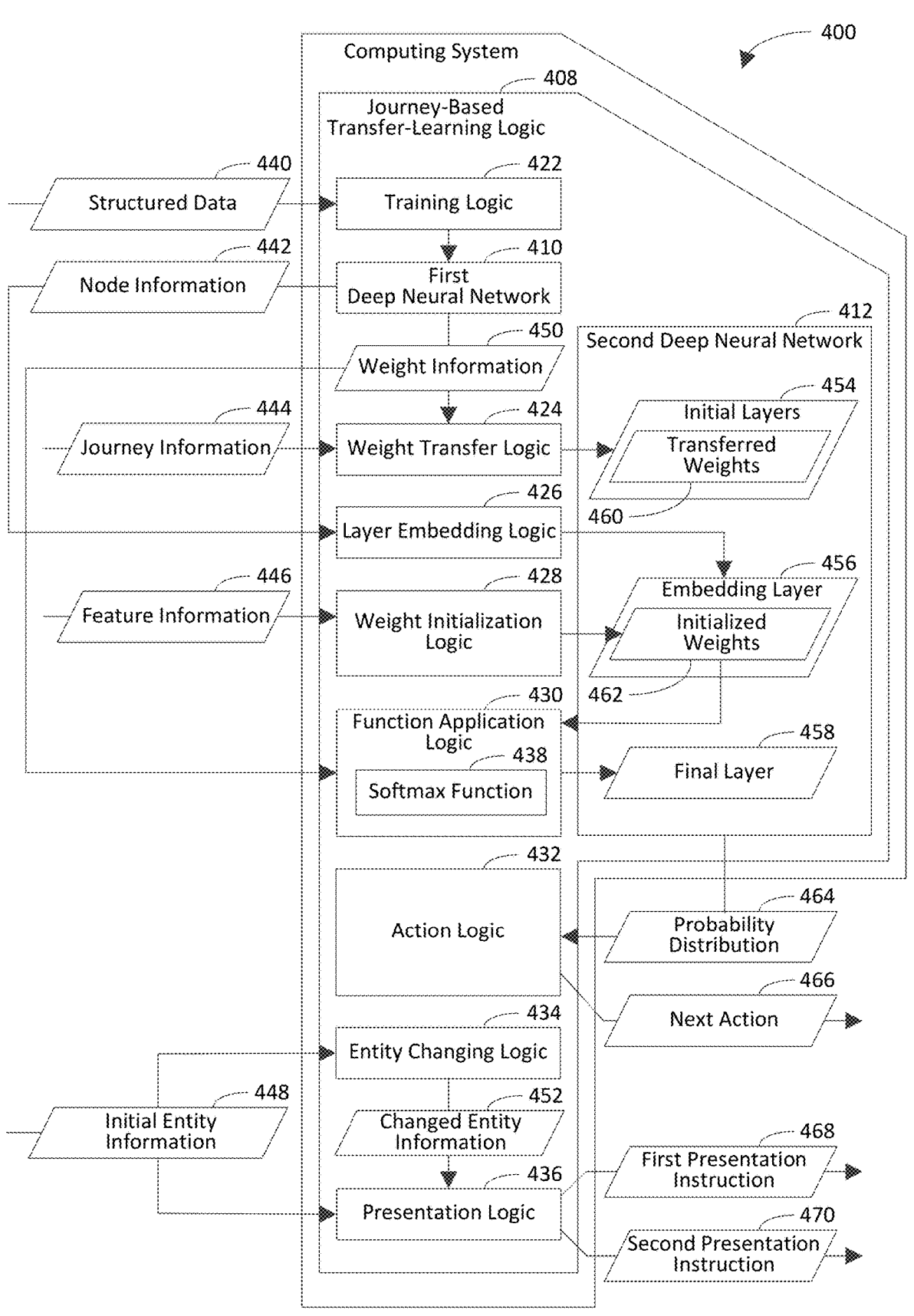
FIG. 4 is a block diagram of an example computing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

A first deep neural network associated with a first journey can be used to construct a second deep neural network associated with a second journey based at least on a similarity between the first and second journeys. Examples of a journey include but are not limited to a digital buyer journey, an engineering support journey, a journey of a compute system (e.g., virtualized storage or virtualized network) over time, and a journey of a software product over time. In an example digital buyer journey, a user visits a website to make a purchase, and a deep neural network determines the next content to be provided to the user to facilitate the purchase. In an example engineering support journey, a user submits an engineering support ticket that identifies an issue, and a deep neural network determines the next document (e.g., article) to be provided to the user to facilitate resolving the issue. In an example journey of a compute system or a software product, a deep neural network determines a next action (e.g., maintenance action, upgrade action, or re-configuration) to be performed with regard to the compute system or the software product. For instance, in the example journey of the compute system, the next action may include replacing a failing hard drive or upgrading or updating a software system or a RAID configuration.

Transfer-learning can be used to construct the second deep neural network based at least on the first deep neural network, even though one or more features associated with the second journey are not included in structured data that are used to train the first deep neural network. Transfer-learning is a process of applying knowledge, which is learned with regard to solving a first problem, to solve a second problem that is different from but related to the first problem. For instance, information regarding a first journey that pertains to a first entity may be used to perform a second journey that pertains to a second entity based at least on a similarity between the first and second journeys. Examples of an entity include but are not limited to a compute system, a software product, and a website. Structured data is data that has a defined structure. For example, the structured data may be organized into rows and columns. In accordance with this example, the rows and columns constitute the defined structure.

Transfer-learning works relatively well for unstructured datasets (e.g., images) because the unstructured datasets typically have a standard representation. For instance, images typically have an input size of $X*Y$. When utilizing transfer-learning, the same architecture is used for the reference deep neural network and the deriving deep neural network for most of the consecutive initial input layers. For instance, language models (e.g., natural language processing (NLP) models) can be trained to predict the next word in a given language, and the last couple of layers can be modified to address the specific problem. A challenge in applying transfer-learning to structured datasets is that the input format can be quite different with even one additional feature. This challenge can be addressed by having a deep neural network for the additional feature(s) connecting to an additional node on the pre-final layer of the original deep neural network.

Example embodiments described herein are capable of performing transfer-learning for structured data with regard to journeys defined by sets of actions. For example, nodes and corresponding weights in each layer of the first deep neural network that precedes the final layer (a.k.a. last layer or last used layer) may be incorporated into the second deep neural network using a transfer-learning technique. An embedding layer having the same number of nodes as the pre-final layer of the first deep neural network may be incorporated into the second deep neural network in lieu of the final layer of the first deep neural network. A pre-final layer (a.k.a. next-to-last layer) of a deep neural network is the layer that immediately precedes the final layer of the deep neural network. Weights of the nodes in the embedding layer may be established by taking into consideration the feature(s) not included in the structured data. A softmax function may be applied on a final layer of the second deep neural network based at least on the weights of nodes in the embedding layer and the pre-final layer.

Example techniques described herein have a variety of benefits as compared to conventional techniques for constructing a deep neural network. For instance, the example techniques enable transfer-learning at scale for similar journeys. For example, once a deep neural network associated with a digital buyer journey for a particular product, such as Power BI®, the deep neural network can be used to initialize the parameters of another similar deep neural network associated with a digital buyer journey for another product, such as Microsoft Dynamics®, Office 365®, or Power-Apps®. In another example, if a deep neural network associated with an engineering support journey for a specific enterprise product X is constructed, the deep neural network can be leveraged to construct another deep neural network that predicts the next best action for another enterprise product Y.

The example techniques enable transfer-learning for structured datasets. The transfer-learning on the structured datasets may be enabled by adding an embedding layer to the deep neural network such that the embedding layer has the same number of nodes as a pre-final layer of a reference deep neural network on which the deep neural network is based. For example, the embedding layer may incorporate new feature(s), which are not present in structured data that is used to train the reference deep neural network, into the features of the structured data.

The example techniques may initialize weights of the nodes in the embedding layer based on a probability that the new feature(s) co-occur with each of the features in the structured data. The example techniques may increase accuracy and/or precision of characteristics of an entity with regard to which a journey is performed, which may result in an outcome having a relatively higher value. The example techniques may optimize assignment of cohort groups among treatment and control groups. For example, each cohort group may receive a personalized design variant that optimizes the outcome a priori. In accordance with this example, a first cohort group is assigned to a control group for which the reference deep neural network is utilized, and a second cohort group is assigned to a treatment group for which the deep neural network, which is based on the reference deep neural network, is utilized.

The example techniques may be capable of increasing accuracy, precision, and/or reliability of predictions of possible next actions of a journey that are provided by a deep neural network, for example, by basing the deep neural network on another deep neural network that is associated with a similar journey. The example techniques may automate construction of a deep neural network for which sample data is relatively sparse by using transfer-learning on structured data. Accordingly, the amount of time that is consumed to construct the deep neural network may be reduced. For instance, the example techniques may automatically construct the deep neural network based on nodes and corresponding weights in layers of another deep neural network that is trained on the structured data based at least on journeys that are associated with the respective deep neural networks being similar. By automating the construction of the deep neural network, an efficiency of an information technology (IT) professional who would otherwise be tasked with constructing the deep neural network is increased. By eliminating a need for the IT professional to construct the deep neural network manually, a cost of constructing the deep neural network may be reduced. For instance, time spent by the IT professional to manually construct the deep neural network has an associated cost. By eliminating the manual construction, the cost of constructing the deep neural network can be reduced by the labor cost associated with the IT professional performing the manual construction.

The example techniques may reduce an amount of time and/or resources (e.g., processor cycles, memory, network bandwidth) that is consumed to construct a deep neural network. For instance, by using a reference deep neural network to construct the deep neural network in accordance with any one or more of the example techniques described herein, an amount of time and/or resources associated with constructing the deep neural network may be reduced. By automatically constructing the deep neural network, the time and/or resources that would have been consumed to manually construct the deep neural network is reduced. By reducing the amount of time and/or resources that is consumed by a computing system to facilitate manual construction of the deep neural network, the efficiency of the computing system may be increased.

FIG. 1 is a block diagram of an example journey-based transfer-learning system 100 in accordance with an embodiment. Generally speaking, the journey-based transfer-learning system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the journey-based transfer-learning system 100 performs transfer-learning for structured data with regard to journeys defined by sets of actions. Detail regarding techniques for performing transfer-learning for structured data with regard to journeys defined by sets of actions is provided in the following discussion.

As shown in FIG. 1, the journey-based transfer-learning system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the journey-based transfer-learning system 100.

The first server(s) 106A are shown to include journey-based transfer-learning logic 108, a first deep neural network (DNN) 110, and a second DNN 112 for illustrative purposes. The journey-based transfer-learning logic 108 is configured to perform transfer-learning for structured data with regard to journeys defined by sets of actions. For instance, the journey-based transfer-learning logic 108 may use the first DNN 110, which is associated with a first journey and which is trained using structured data, to construct the second DNN 112, which is associated with a second journey that is similar to the first journey, in accordance with a transfer-learning technique.

In an example implementation, the journey-based transfer-learning logic 108 trains the first DNN 110, which is associated with a first set of actions that defines a first journey, by learning weights of nodes among layers of the first DNN 110 that precede a final layer of the first DNN 110 using structured data. The journey-based transfer-learning logic 108 transfers the weights from the first DNN 110 to corresponding nodes in the second DNN 112, which is associated with a second set of actions that defines a second journey, in accordance with a transfer-learning technique based at least on a similarity between the first set of actions and the second set of actions satisfying a similarity criterion. The journey-based transfer-learning logic 108 adds an embedding layer in lieu of the final layer of the first DNN 110 in the second DNN 112 such that an output of the embedding layer results in a same number of nodes as a pre-final layer of the first DNN 110. The journey-based transfer-learning logic 108 initializes weights of the respective nodes in the embedding layer based at least on a probability that a new feature co-occurs with each of the features in the structured data. The new feature is associated with the second journey and is not included among the features in the structured data, which are used to learn the weights in the first DNN 110. The journey-based transfer-learning logic 108 applies a softmax function on a final layer of the second DNN 112. The softmax function is configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique.

In an example implementation, the first DNN 110 pertains to a first digital buyer journey regarding a first software product, and the second DNN 112 pertains to a second digital buyer journey regarding a second software product. In another example implementation, the first DNN 110 pertains to a first engineering support journey regarding a first software product, and the second DNN 112 pertains to a second engineering support journey regarding a second software product. In yet another example implementation, the first journey pertains to a lifecycle of a first compute system, and the second journey pertains to a lifecycle of a second compute system. In still another example implementation, the first journey pertains to a lifecycle of a first software product, and the second journey pertains to a lifecycle of a second software product.

The journey-based transfer-learning logic 108 may be implemented in various ways to perform transfer-learning for structured data with regard to journeys defined by sets of actions, including being implemented in hardware, software, firmware, or any combination thereof. For example, the journey-based transfer-learning logic 108 may be implemented as computer program code configured to be executed in one or more processors. In another example, at least a portion of the journey-based transfer-learning logic 108 may be implemented as hardware logic/electrical circuitry. For instance, at least a portion of the journey-based transfer-learning logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The journey-based transfer-learning logic 108, the first DNN 110, and the second DNN 112 are shown to be incorporated in the first server(s) 106A for illustrative purposes and are not intended to be limiting. It will be recognized that the journey-based transfer-learning logic 108 (or any portion(s) thereof) may be incorporated in any one or more of the servers 106A-106N, any one or more of the user devices 102A-102M, or any combination thereof. For example, client-side aspects of the journey-based transfer-learning logic 108 may be incorporated in one or more of the user devices 102A-102M, and server-side aspects of journey-based transfer-learning logic 108 may be incorporated in one or more of the servers 106A-106N. It will be further recognized that each of the first and second DNNs 110 and 112 (or any portion(s) thereof) may be incorporated in any one or more of the servers 106A-106N, any one or more of the user devices 102A-102M, or any combination thereof.

FIGS. 2-3 depict flowcharts 200 and 300 of example methods for performing transfer-learning for structured data with regard to journeys defined by sets of actions in accordance with embodiments. Flowcharts 200 and 300 may be performed by the first server(s) 106A shown in FIG. 1, for example. For illustrative purposes, flowcharts 200 and 300 are described with respect to computing system 400 shown in FIG. 4, which is an example implementation of the first server(s) 106A. As shown in FIG. 4, the computing system 400 includes journey-based transfer-learning logic 408. The journey-based transfer-learning logic 408 includes a first deep neural network (DNN) 410, a second DNN 412, training logic 422, weight transfer logic 424, layer embedding logic 426, weight initialization logic 428, function application logic 430, action logic 432, entity changing logic 434, and presentation logic 436. Further structural and operational embodiments will be apparent to persons skilled in the relevant art(s) based on the discussion regarding flowcharts 200 and 300.

As shown in FIG. 2, the method of flowchart 200 begins at step 202. In step 202, a first deep neural network, which is associated with a first set of actions that defines a first journey, is trained by learning weights of nodes among layers of the first deep neural network that precede a final layer of the first deep neural network using structured data. In an example implementation, training logic 422 trains the first DNN 410, which is associated with a first set of actions that defines a first journey, by learning weights of nodes among layers of the first deep neural network 410 that precede a final layer of the first deep neural network 410 using structured data.

In an example embodiment, the structured data includes device features, entity features, and interaction features. Each device feature represents a respective attribute of a device (e.g., computing system) that interacts with an entity associated with the first journey. Examples of an entity include but are not limited to a website and a software program (e.g., software product). Each entity feature represents a respective attribute of the entity. Each interaction feature represents a respective attribute of an interaction between a device and the entity.

In the context of a digital buyer journey, examples of a device feature include but are not limited to hardware and/or software (e.g., operating system, browser) used by the device, a configuration of screen resolution, a type of the device (e.g., mobile device, desktop device, or laptop device), and a type of search channel used to search for results. Examples of an entity feature include but are not limited to a web page, information accessible via the web page, an action button on the web page (e.g., Free Trial, Buy Now, Add to Cart), a navigational element (e.g., internal search, left assisted navigation, top assisted navigation, or scroll element), and a backend commerce component of the web page that enables transactions to occur. Examples of an interaction feature include but are not limited to a previously visited web page, a behavioral element regarding the previously visited web page (e.g., time spent performing operations on the web page, time spent on the visit to the web page, a number of clicks performed on the web page, a depth of a website that was visited, a navigational path through the web site, an interaction with a navigational element (e.g., keyword used in an internal search), a commerce action, and an interaction with a scroll bar.

In the context of an engineering support journey, examples of a device feature include but are not limited to the age of the device and the type and/or configuration of the compute, storage, memory, and/or networking employed by the device. Examples of an entity feature include but are not limited to a Knowledge Base (KB) article describing steps to troubleshoot an issue with which the journey pertains and an online lab, user manual, and/or whitepaper describing steps to resolve an issue with which the journey pertains. Examples of an interaction feature include but are not limited to a transcript of interactions between the device (or a user thereof) and the entity (or a representative thereof). Examples of such an interaction include but are not limited to a website visit, a mobile application visit, an email interaction, a chat with a technical support representative, a call to a technical support representative over the phone, arranging a site visit, and posting a question on a forum.

In the context of a journey of a compute system over time, examples of a device feature include but are not limited to a number of hard drives in the device, a performance metric from the hard drive(s) (e.g., latency, bandwidth, or throughput), wear and tear of the hard drive(s), and a specific configuration used. Examples of an entity feature include but are not limited to a temperature of the hard drive(s), a pressure experienced by the hard drive(s), and an external load of the hard drive(s). Examples of an interaction feature include but are not limited to a number of requests serviced during a period of time and an outage error.

In an example embodiment, input of the deep neural network is a series of touchpoints between device(s) and the entity. For instance, each touchpoint may be represented by a feature vector that includes the device features, the entity features, and the interaction features.

At step 204, the weights from the first deep neural network are transferred to corresponding nodes in a second deep neural network, which is associated with a second set of actions that defines a second journey, in accordance with a transfer-learning technique based at least on a similarity between the first set of actions and the second set of actions satisfying a similarity criterion. In an example implementation, the weight transfer logic 424 transfers the weights from the first DNN 410 to corresponding nodes in the second DNN 412, which is associated with a second set of actions that defines a second journey, in accordance with a transfer-learning technique based at least on a similarity between the first set of actions and the second set of actions satisfying a similarity criterion. For instance, the weight transfer logic 424 may analyze weight information 450, which indicates the weights from the first DNN 410, to determine the weights that are to be assigned to the corresponding nodes in the second DNN 412. Accordingly, the weight transfer logic 424 assigns transferred weights 460, which are transferred from the first DNN 410, to the corresponding nodes in initial layers 454 of the second DNN 412. The initial layers 454 are the layers of the second DNN 412 that correspond to the layers of the first DNN 410 that precede the final layer of the first DNN 410.

In an example embodiment, the weight transfer logic 424 receives journey information 444, which indicates the first set of actions that defines the first journey and the second set of actions that defines the second journey. In accordance with this embodiment, the weight transfer logic 424 analyzes the journey information 444 to determine the similarity between the first set of actions and the second set of actions. In an aspect of this embodiment, the weight transfer logic 424 compares each action in the second set of actions to each action in the second set of actions to determine whether the respective action in the first set is similar to any one or more of the actions in the second set. An action in the first set may be deemed to be similar to an action in the second set based on the action in the first set being the same as the action in the second set, the action in the first set being categorized into the same category in which the action in the second set is categorized, a result of the action in the first set having a result that is substantially the same as the action in the second set, a probability of the action in the first set corresponding to the action in the second set being greater than or equal to a probability threshold, and/or a confidence in the aforementioned probability being greater than or equal to a confidence threshold. In another aspect of this embodiment, the weight transfer logic 424 transfers the weights from the first DNN 110 to the corresponding nodes in the second DNN 112 based at least on cumulative similarities between the first set of actions and the second set of actions being greater than or equal to a cumulative similarity threshold.

At step 206, an embedding layer is added in lieu of the final layer of the first deep neural network in the second deep neural network such that an output of the embedding layer results in a same number of nodes as a pre-final layer of the first deep neural network. It will be recognized that the pre-final layer of the first deep neural network is the layer of the first deep neural network that immediately precedes the final layer of the first deep neural network. In an example implementation, the layer embedding logic 426 adds an embedding layer 456 in lieu of the final layer of the first DNN 410 in the second DNN 412 such that an output of the embedding layer 456 results in a same number of nodes as a pre-final layer of the first DNN 410. For instance, the layer embedding logic 426 may analyze node information 442, which indicates the number of nodes in the pre-final layer of the first DNN 410, to determine the number of nodes to be included in the embedding layer 456.

In an example embodiment, adding the embedding layer in the second deep neural network at step 206 includes concatenating the new feature from the second deep neural network with the features in the structured data that are used to learn the weights in the first deep neural network. For instance, the layer embedding logic 426 may establish nodes in the embedding layer 456 such that the nodes represent a concatenation of the new feature and the features in the structured data 440.

At step 208, weights of the respective nodes in the embedding layer are initialized based at least on a probability that a new feature, which is associated with the second journey and which is not included among features in the structured data that are used to learn the weights in the first deep neural network, co-occurs with each of the features in the structured data (e.g., in a common user session). In an example implementation, the weight initialization logic 428 initializes the weights of the respective nodes in the embedding layer 456 to provide respective initialized weights 462 based at least on the probability that the new feature, which is not included among features in the structured data 440, co-occurs with each of the features in the structured data 440. In an example embodiment, the weight initialization logic 428 analyzes feature information 446, which indicates the features that are associated with the first journey and the features that are associated with the second journey. It will be recognized that the features in the structured data 440 are associated with the first journey. The weight initialization logic 428 may analyze the feature information 446 by comparing the features that are associated with the first journey and the features that are associated with the second journey to determine that the features that are associated with the second journey include the new feature and that the features that are associated with the first journey do not include the new feature. Based on a determination of the new feature, the weight initialization logic 428 calculates the probability of co-occurrence of the new feature with each of the features that are associated with the first journey.

In an example implementation, assume that the first DNN 410 has two click actions: "Buy Now" and "Free Trial." In this implementation, the second journey has an additional click action "Renew." The value of "Renew" in the embedding layer 456 can be learned from the second DNN 412 based at least on the probability of co-occurrence of "Renew" with the existing features in the first journey in the same visiting session.

At step 210, a softmax function is applied on a final layer of the second deep neural network. The softmax function is configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique. In an example implementation, the function application logic 430 applies a softmax function 438 on the final layer 458 of the second DNN 412. The softmax function 438 is configured to generate a probability distribution 464 based at least on the initialized weights 456 of the respective nodes in the embedding layer 456 and further based at least on the weights of the respective nodes in the pre-final layer, which are included among the transferred weights 460.

In an example embodiment, the set of actions that defines the first journey is associated with a first software program, and the set of actions that defines the second journey is associated with a second software program that is different from the first software program. For instance, the set of actions that defines the first journey may be performed with regard to (e.g., on) the first software program, and the set of actions that defines the second journey may be performed with regard to (e.g., on) the second software program. In a first aspect of this embodiment, the possible next actions include respective remedial actions regarding a technical issue associated with the second software program. In a second aspect of this embodiment, the possible next actions include offering respective sets of terms regarding a purchase of the second software program. For instance, offering the sets of terms may include applying respective discounts to a purchase price of the second software program. In a third aspect of this embodiment, the possible next actions include presenting respective documents regarding the second software program via a user interface (e.g., web interface).

In another example embodiment, transferring the weights from the first deep neural network to the corresponding nodes in the second deep neural network at step 204 is performed as a result of a number of features that are associated with the second journey being different from a number of features that are associated with the first journey. In accordance with this embodiment, the embedding layer maps the number of features that are associated with the second journey into the number of features that are associated with the first journey. In an aspect of this embodiment, the embedding layer maps the number of features that are associated with the second journey into a number of features represented by the nodes in the second deep neural network that precede the embedding layer.

In some example embodiments, one or more steps 202, 204, 206, 208, and/or 210 of flowchart 200 may not be performed. Moreover, steps in addition to or in lieu of steps 202, 204, 206, 208, and/or 210 may be performed. For instance, in an example embodiment, the method of flowchart 200 further includes identifying a next action to be performed in the second journey based at least on the next action having a probability in the probability distribution that is greater than a probability of each of the other possible next actions in the probability distribution. For example, the next action may be identified based on the probabilities in the probability distribution at a specified time instance in the second journey. In another example, the next action may be predicted as a multi-class problem. In an example implementation, the action logic 432 identifies a next action 466 to be performed in the second journey based at least on the next action 466 having a probability in the probability distribution 464 that is greater than a probability of each of the other possible next actions in the probability distribution 464.

In another example embodiment, the method of flowchart 200 further includes one or more of the steps shown in flowchart 300 of FIG. 3. As shown in FIG. 3, the method of flowchart 300 begins at step 302. In step 302, an initial version of an entity that is associated with the second journey is changed to provide a changed version of the entity. In an example implementation, the entity change logic 434 changes the initial version of the entity that is associated with the second journey to provide the changed version of the entity. For example, the entity change logic 434 may receive initial entity information 448, which indicates (e.g., describes) the initial version of the entity. The initial entity information 448 may identify attributes of the initial version of the entity. In accordance with this example, the entity change logic 434 may analyze the initial entity information 448 to determine the initial version of the entity. The entity change logic 434 may change one or more of the attributes of the initial version of the entity to provide the changed version of the entity. In accordance with this implementation, the entity change logic 434 generates changed entity information 452, which indicates the changed version of the entity. The changed entity information 452 may identify attributes of the changed version of the entity.

At step 304, the changed version of the entity is caused to be presented in lieu of the initial version of the entity to a first subset of users who are associated with the second journey based at least on a prediction that presentation of the changed version to the users in the first subset is more likely than presentation of the initial version to the users in the first subset to cause the second journey for the users in the first subset to have a designated result. In an example implementation, the presentation logic 436 causes the changed version of the entity to be presented in lieu of the initial version of the entity to the first subset of the users. For instance, the presentation logic 452 may generate a first presentation instruction 468, which indicates that the changed version of the entity is to be presented to the first subset of the users. The presentation logic 452 may specify the attributes of the changed version of the entity, as indicated by the changed entity information 452.

At step 306, the initial version of the entity is caused to be presented to a second subset of the users who are associated with the second journey. For instance, causing the initial version of the entity to be presented to the second subset of the users at step 306 may be performed based at least on a prediction that presentation of the changed version to the users in the second subset is not more likely than presentation of the initial version to the users in the second subset to cause the second journey for the users in the second subset to have the designated result. The first subset of the users and the second subset of the users are mutually exclusive. In an example implementation, the presentation logic 436 causes the initial version of the entity to be presented to the second subset of the users. For instance, the presentation logic 452 may generate a second presentation instruction 470, which indicates that the initial version of the entity is to be presented to the second subset of the users. The presentation logic 452 may specify the attributes of the initial version of the entity, as indicated by the initial entity information 448.

In an example digital buyer journey implementation of this embodiment, the journey-based transfer-learning logic 408 predicts which web visitors will purchase a product based on visitor and website characteristics and a series of visitor-website interactions. The owner of the product is to optimize the website or tech support portal with a personalized experience that can increase the success rate of purchase conversion on each individual visitor. It is often difficult to design an A/B/N test with various treatments and match each design variant to a different cohort or journey. The journey-based transfer-learning logic 408 provides auto-matching to optimize the assignment of each user to either a treatment group or a control group based on the cohort group in which the user is classified by the journey-based transfer-learning logic 408. Accordingly, each cohort group receives a personalized design variant that optimizes the outcome a priori, and two random samples of the entities are taken from the cohort. A first random sample receives the design variant (i.e., the second DNN 412), and the second random sample receives the original design (i.e., the first DNN 410). For example, a treatment in which the purchase button is moved to the top of the site may lead to fewer mouse-scrolling events (i.e., a lower mouse-scrolling event count). In accordance with this example, the treatment may be paired to the cohort whose feature value on mouse-scrolling event count negatively correlates with the purchase conversion.

It will be recognized that the computing system 400 may not include one or more of the journey-based transfer-learning logic 408, the first DNN 410, the second DNN 412, the training logic 422, the weight transfer logic 424, the layer embedding logic 426, the weight initialization logic 428, the function application logic 430, the action logic 432, the entity changing logic 434, and/or the presentation logic 436. Furthermore, the computing system 400 may include components in addition to or in lieu of the journey-based transfer-learning logic 408, the first DNN 410, the second DNN 412, the training logic 422, the weight transfer logic 424, the layer embedding logic 426, the weight initialization logic 428, the function application logic 430, the action logic 432, the entity changing logic 434, and/or the presentation logic 436.

Figure 5:
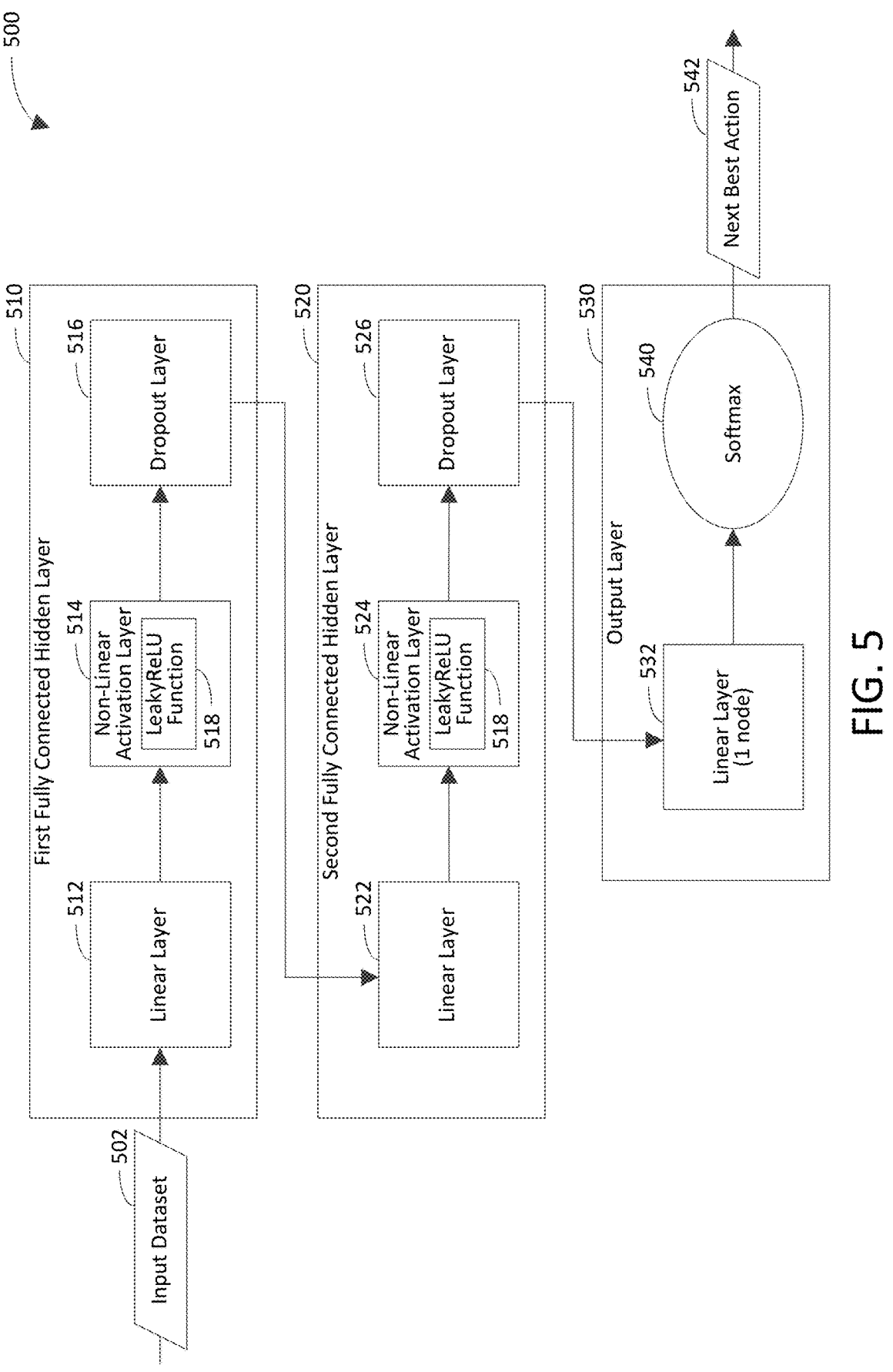
FIG. 5 is a block diagram of an example deep neural network in accordance with an embodiment.

FIG. 5 is a block diagram of an example deep neural network (DNN) 500 in accordance with an embodiment. Any one or more aspect of the DNN 500 may be incorporated into the first DNN 110 and/or the second DNN 112 shown in FIG. 1 and/or the first DNN 410 and/or the second DNN 412 shown in FIG. 4. It will be recognized that the DNN 500 can be modified to include an embedding layer (e.g., embedding layer 456 of FIG. 4) to incorporate functionality of any one or more of the embodiments described herein. For instance, incorporating an embedding layer into the DNN 500 may enable any organization to map its features to generic features on the input side.

The DNN 500 processes an input dataset 502 to determine a next best action 542. The number of inputs of the DNN 500 is the same as the number of features that are extracted from the input dataset 502. As shown in FIG. 5, the DNN 500 includes a first fully connected hidden layer 510, a second fully connected hidden layer 520, and an output layer 530. The first fully connected hidden layer 510 includes a linear layer 512, a non-linear activation layer 514, and a dropout layer 516. The linear layer 512 performs an affine transformation, and the non-linear activation layer 514 performs a non-linear transformation using a non-linear activation function 518, which is referred to herein as "LeakyReLU." The second fully connected hidden layer 520 includes a linear layer 522, a non-linear activation layer 524, and a dropout layer 526. The linear layer 522 performs an affine transformation, and the non-linear activation layer 524 performs a non-linear transformation using the non-linear activation function 518 (i.e., LeakyReLU). Accordingly, the architectures of the respective first and second connected hidden layers 510 and 520 are the same. The output layer 530 includes a linear layer 532 and a softmax layer 540. The output layer 530 has the same number of nodes as the set of possible actions.

The loss between the layers 510, 520, and 530 is referred to as the "CrossEntropy loss." The weights of the different layers are initialized randomly and then calculated using a classic stochastic gradient descent technique through multiple passes over the observations (1 full pass=1 epoch). Each pass involves multiple batches (1 epoch=N batches, where N determines the size of the dataset and the batch size). If K is the number of observations, K/N+1 is the number of batches. The forward pass involves application of the affine and non-linear transformations from the input layer (i.e., the first fully connected hidden layer 510 in this example) to the output layer 530. The loss is computed at the output layer 530. The loss is then back-propagated back to the input layer by differentiating the loss with respect to each of the unknowns. The gradients are then subtracted from the unknowns so that the loss is decreases in the next iteration. This process is repeated until the loss on the validation set starts to increase, at which time the training is "early stopped." The equations utilized by the DNN 500 are listed below.

An API may be configured to enable users to choose an architecture of the DNN 500 from multiple possible architectures. The DNN 500 is shown to include two hidden layers for illustrative purposes and is not intended to be limiting. It will be recognized that the DNN 500 may include any suitable number of hidden layers (e.g., 2, 3, 5, or 10). The architecture of the DNN 500 in terms of the number of layers, the number of nodes in each hidden layer, the hyper-parameters to train the DNN 500 (e.g., learning rate, dropout rates, and weight decay) may be selected based on the performance on the holdout dataset with an objective to learn the unknown weights in such a way that the overall error of the DNN 500 is minimized. A weight matrix and an input matrix (i.e., outputs of the previous hidden layer) are received at each of the first and second fully connected hidden layers 510 and 520. The outputs of the respective linear layers 512 and 522 are represented by the following equation, where $b_H$ is the bias of the hidden layer H:

$$Output_{Linear}=W_H X_{H-1}+b_H \qquad \text{(Equation 1)}$$

The non-linear activation function 518 is represented by the following equation:

$$X=LeakyReLU(x) \qquad \text{(Equation 2)}$$

The function LeakyReLU has the following form:

$$X=LeakyReLU(x)=x \text{ if } x>0, \text{ else } 0.01x \qquad \text{(Equation 3)}$$

Each of the first and second fully connected hidden layers 510 and 520 randomly turns off activations as defined by the dropout probability set by the respective dropout layers 516 and 526. The size of the last hidden layer (i.e., the second fully connected hidden layer 520 in this example) is fixed to include the same number of nodes as the number of potential output actions. The softmax function 540 at the output ensures that the best action (i.e., the possible action with the highest probability) is chosen from the various possible actions.

Equations 4-7 below represent the transformations through the architecture of the DNN 500:

$$X_1=dropout_1(LeakyReLU(W_1*X_0+b_1)) \qquad \text{(Equation 4)}$$

$$X_2=dropout_1(LeakyReLU(W_2*X_1+b_2)) \qquad \text{(Equation 5)}$$

$$X_3=W_3*X_2 \qquad \text{(Equation 6)}$$

$$output=softmax(X_3) \qquad \text{(Equation 7)}$$

The example embodiments may provide output instrumentation that can be used by users to configure the architecture of the DNN 500.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the journey-based transfer-learning logic 108, the first DNN 110, the second DNN 112, the journey-based transfer-learning logic 408, the first DNN 410, the second DNN 412, the training logic 422, the weight transfer logic 424, the layer embedding logic 426, the weight initialization logic 428, the function application logic 430, the action logic 432, the entity changing logic 434, the presentation logic 436, the DNN 500, the first fully connected hidden layer 510, the linear layer 512, the non-linear activation layer 514, the dropout layer 516, the second fully connected hidden layer 520, the linear layer 522, the non-linear activation layer 524, the dropout layer 526, the output layer 530, the linear layer 532, the softmax layer 540, flowchart 200, and/or flowchart 300 may be implemented in hardware, software, firmware, or any combination thereof.

For example, any one or more of the journey-based transfer-learning logic 108, the first DNN 110, the second DNN 112, the journey-based transfer-learning logic 408, the first DNN 410, the second DNN 412, the training logic 422, the weight transfer logic 424, the layer embedding logic 426, the weight initialization logic 428, the function application logic 430, the action logic 432, the entity changing logic 434, the presentation logic 436, the DNN 500, the first fully connected hidden layer 510, the linear layer 512, the non-linear activation layer 514, the dropout layer 516, the second fully connected hidden layer 520, the linear layer 522, the non-linear activation layer 524, the dropout layer 526, the output layer 530, the linear layer 532, the softmax layer 540, flowchart 200, and/or flowchart 300 may be implemented, at least in part, as computer program code configured to be executed in one or more processors.

In another example, any one or more of the journey-based transfer-learning logic 108, the first DNN 110, the second DNN 112, the journey-based transfer-learning logic 408, the first DNN 410, the second DNN 412, the training logic 422, the weight transfer logic 424, the layer embedding logic 426, the weight initialization logic 428, the function application logic 430, the action logic 432, the entity changing logic 434, the presentation logic 436, the DNN 500, the first fully connected hidden layer 510, the linear layer 512, the non-linear activation layer 514, the dropout layer 516, the second fully connected hidden layer 520, the linear layer 522, the non-linear activation layer 524, the dropout layer 526, the output layer 530, the linear layer 532, the softmax layer 540, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
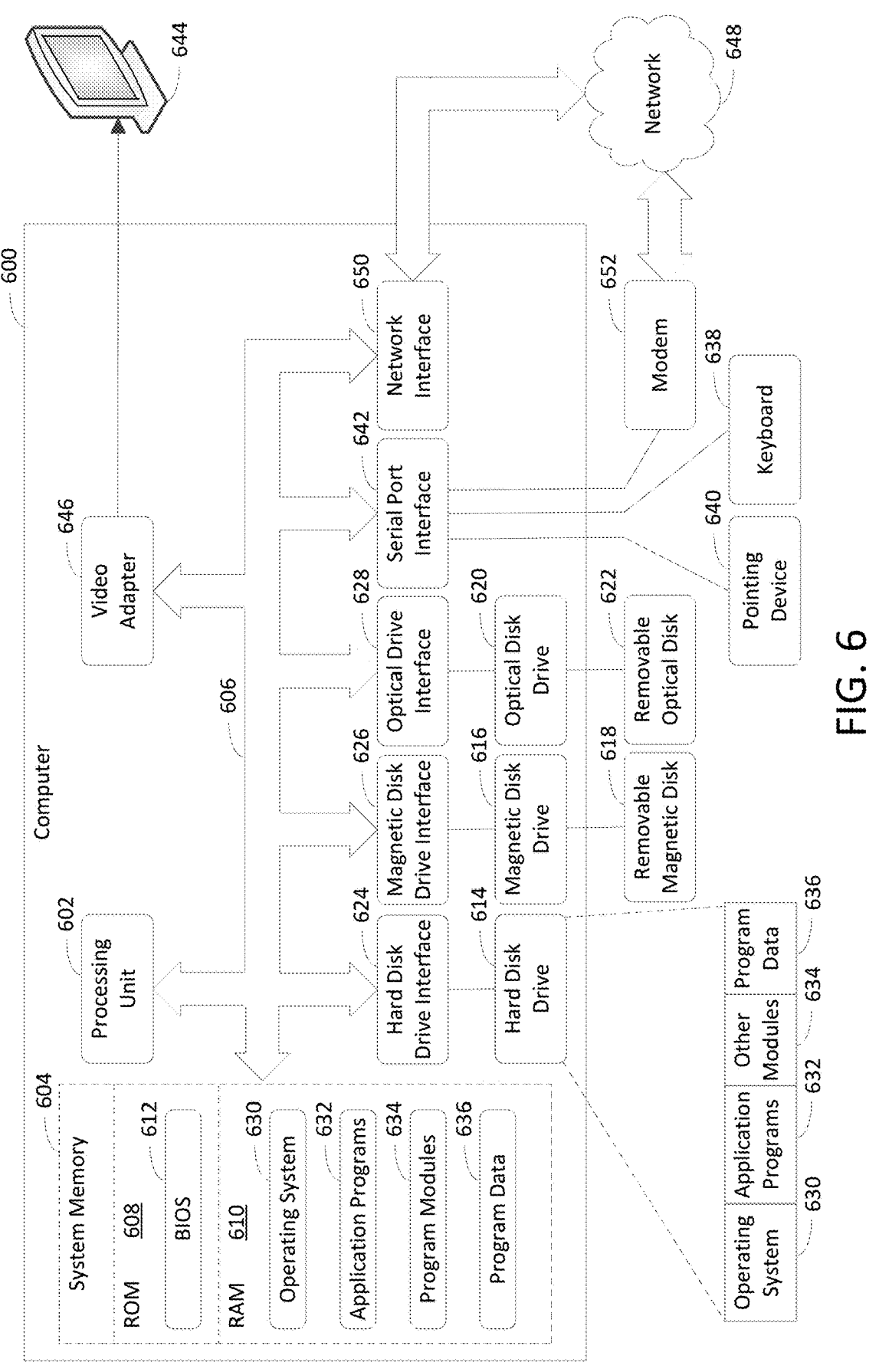
FIG. 6 depicts an example computer in which embodiments may be implemented.

II. Further Discussion of Some Example Embodiments (A1) An example system (FIG. 1, 102A-102M, 106A-106N; FIG. 4, 400; FIG. 6, 600) comprises memory (FIG. 6, 604, 608, 610) and a processing system (FIG. 6, 602)

coupled to the memory. The processing system is configured to train (FIG. 2, 202) a first deep neural network (FIG. 1, 110; FIG. 4, 410), which is associated with a first set of actions that defines a first journey, by learning weights of nodes among layers of the first deep neural network that precede a final layer of the first deep neural network using structured data (FIG. 4, 440). The processing system is further configured to transfer (FIG. 2, 204) the weights from the first deep neural network to corresponding nodes in a second deep neural network (FIG. 1, 112; FIG. 4, 412), which is associated with a second set of actions that defines a second journey, in accordance with a transfer-learning technique based at least on a similarity between the first set of actions and the second set of actions satisfying a similarity criterion. The processing system is further configured to add (FIG. 2, 206) an embedding layer (FIG. 4, 456) in lieu of the final layer of the first deep neural network in the second deep neural network such that an output of the embedding layer results in a same number of nodes as a pre-final layer of the first deep neural network. The processing system is further configured to initialize (FIG. 2, 208) weights of the respective nodes in the embedding layer based at least on a probability that a new feature, which is associated with the second journey and which is not included among features in the structured data that are used to learn the weights in the first deep neural network, co-occurs with each of the features in the structured data. The processing system is further configured to apply (FIG. 2, 210) a softmax function (FIG. 4, 438) on a final layer (FIG. 4, 458) of the second deep neural network. The softmax function is configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique.

(A2) In the example system of A1, wherein the structured data comprises: a plurality of device features, each device feature representing a respective attribute of a device that interacts with an entity associated with the first journey; a plurality of entity features, each entity feature representing a respective attribute of the entity; and a plurality of inter-action features, each interaction feature representing a respective attribute of an interaction between a device and the entity.

(A3) In the example system of any of A1-A2, wherein the set of actions that defines the first journey is associated with a first software program; wherein the set of actions that defines the second journey is associated with a second software program that is different from the first software program; and wherein the possible next actions include respective remedial actions regarding a technical issue associated with the second software program.

(A4) In the example system of any of A1-A3, wherein the set of actions that defines the first journey is associated with a first software program; wherein the set of actions that defines the second journey is associated with a second software program that is different from the first software program; and wherein the possible next actions include offering respective sets of terms regarding a purchase of the second software program.

(A5) In the example system of any of A1-A4, wherein the set of actions that defines the first journey is associated with a first software program; wherein the set of actions that defines the second journey is associated with a second software program that is different from the first software program; and wherein the possible next actions include presenting respective documents regarding the second software program via a user interface.

(A6) In the example system of any of A1-A5, wherein the processing system is configured to: transfer the weights from the first deep neural network to the corresponding nodes in the second deep neural network is performed as a result of a number of features that are associated with the second journey being different from a number of features that are associated with the first journey; and wherein the embedding layer maps the number of features that are associated with the second journey into the number of features that are associated with the first journey.

(A7) In the example system of any of A1-A6, wherein the processing system is configured to: add the embedding layer by concatenating the new feature from the second deep neural network with the features in the structured data that are used to learn the weights in the first deep neural network.

(A8) In the example system of any of A1-A7, wherein the processing system is further configured to: change an initial version of an entity that is associated with the second journey to provide a changed version of the entity; cause the changed version of the entity to be presented in lieu of the initial version of the entity to a first subset of users who are associated with the second journey based at least on a prediction that presentation of the changed version to the users in the first subset is more likely than presentation of the initial version to the users in the first subset to cause the second journey for the users in the first subset to have a designated result; and cause the initial version of the entity to be presented to a second subset of the users who are associated with the second journey.

(B1) An example method is implemented by a computing system (FIG. 1, 102A-102M, 106A-106N; FIG. 4, 400; FIG. 6, 600). The method comprises training (FIG. 2, 202) a first deep neural network (FIG. 1, 110; FIG. 4, 410), which is associated with a first set of actions that defines a first journey, by learning weights of nodes among layers of the first deep neural network that precede a final layer of the first deep neural network using structured data (FIG. 4, 440). The method further comprises transferring (FIG. 2, 204) the weights from the first deep neural network to corresponding nodes in a second deep neural network (FIG. 1, 112; FIG. 4, 412), which is associated with a second set of actions that defines a second journey, in accordance with a transfer-learning technique based at least on a similarity between the first set of actions and the second set of actions satisfying a similarity criterion. The method further comprises adding (FIG. 2, 206) an embedding layer (FIG. 4, 456) in lieu of the final layer of the first deep neural network in the second deep neural network such that an output of the embedding layer results in a same number of nodes as a pre-final layer of the first deep neural network. The method further comprises initializing (FIG. 2, 208) weights of the respective nodes in the embedding layer based at least on a probability that a new feature, which is associated with the second journey and which is not included among features in the structured data that are used to learn the weights in the first deep neural network, co-occurs with each of the features in the structured data. The method further comprises applying (FIG. 2, 210) a softmax function (FIG. 4, 438) on a final layer (FIG. 4, 458) of the second deep neural network. The softmax function is configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique.

(B2) In the method of B1, wherein the structured data comprises: a plurality of device features, each device feature representing a respective attribute of a device that interacts with an entity associated with the first journey; a plurality of entity features, each entity feature representing a respective attribute of the entity; and a plurality of interaction features, each interaction feature representing a respective attribute of an interaction between a device and the entity.

(B3) In the method of any of B1-B2, wherein the set of actions that defines the first journey is associated with a first software program; wherein the set of actions that defines the second journey is associated with a second software program that is different from the first software program; and wherein the possible next actions include respective remedial actions regarding a technical issue associated with the second software program.

(B4) In the method of any of B1-B3, wherein the set of actions that defines the first journey is associated with a first software program; wherein the set of actions that defines the second journey is associated with a second software program that is different from the first software program; and wherein the possible next actions include offering respective sets of terms regarding a purchase of the second software program.

(B5) In the method of any of B1-B4, wherein the set of actions that defines the first journey is associated with a first software program; wherein the set of actions that defines the second journey is associated with a second software program that is different from the first software program; and wherein the possible next actions include presenting respective documents regarding the second software program via a user interface.

(B6) In the method of any of B1-B5, wherein transferring the weights from the first deep neural network to the corresponding nodes in the second deep neural network is performed as a result of a number of features that are associated with the second journey being different from a number of features that are associated with the first journey; and wherein the embedding layer maps the number of features that are associated with the second journey into the number of features that are associated with the first journey.

(B7) In the method of any of B1-B6, wherein adding the embedding layer comprises: concatenating the new feature from the second deep neural network with the features in the structured data that are used to learn the weights in the first deep neural network.

(B8) In the method of any of B1-B7, further comprising: changing an initial version of an entity that is associated with the second journey to provide a changed version of the entity; causing the changed version of the entity to be presented in lieu of the initial version of the entity to a first subset of users who are associated with the second journey based at least on a prediction that presentation of the changed version to the users in the first subset is more likely than presentation of the initial version to the users in the first subset to cause the second journey for the users in the first subset to have a designated result; and causing the initial version of the entity to be presented to a second subset of the users who are associated with the second journey.

(C1) An example computer program product (FIG. 6, 618, 622) comprising a computer-readable storage medium having instructions recorded thereon for enabling a processor-based system (FIG. 1, 102A-102M, 106A-106N; FIG. 4, 400; FIG. 6, 600) to perform operations. The operations comprise training (FIG. 2, 202) a first deep neural network (FIG. 1, 110; FIG. 4, 410), which is associated with a first set of actions that defines a first journey, by learning weights of nodes among layers of the first deep neural network that precede a final layer of the first deep neural network using structured data (FIG. 4, 440). The operations further comprise transferring (FIG. 2, 204) the weights from the first deep neural network to corresponding nodes in a second deep neural network (FIG. 1, 112; FIG. 4, 412), which is associated with a second set of actions that defines a second journey, in accordance with a transfer-learning technique based at least on a similarity between the first set of actions and the second set of actions satisfying a similarity criterion. The operations further comprise adding (FIG. 2, 206) an embedding layer (FIG. 4, 456) in lieu of the final layer of the first deep neural network in the second deep neural network such that an output of the embedding layer results in a same number of nodes as a pre-final layer of the first deep neural network. The operations further comprise initializing (FIG. 2, 208) weights of the respective nodes in the embedding layer based at least on a probability that a new feature, which is associated with the second journey and which is not included among features in the structured data that are used to learn the weights in the first deep neural network, co-occurs with each of the features in the structured data. The operations further comprise applying (FIG. 2, 210) a soft-max function (FIG. 4, 438) on a final layer (FIG. 4, 458) of the second deep neural network. The softmax function is configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique.

III. Example Computer System

FIG. 6 depicts an example computer 600 in which embodiments may be implemented. Any one or more of the user devices 102A-102M and/or any one or more of the servers 106A-106N shown in FIG. 1 and/or computing system 400 shown in FIG. 4 may be implemented using computer 600, including one or more features of computer 600 and/or alternative features. Computer 600 may be a general-purpose computing device in the form of a conventional personal computer, a mobile computer, or a workstation, for example, or computer 600 may be a special purpose computing device. The description of computer 600 provided herein is provided for purposes of illustration, and is not intended to be limiting. Embodiments may be implemented in further types of computer systems, as would be known to persons skilled in the relevant art(s).

As shown in FIG. 6, computer 600 includes a processing unit 602, a system memory 604, and a bus 606 that couples various system components including system memory 604 to processing unit 602. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

Computer 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 630, one or more application programs 632, other program modules 634, and program data 636. Application programs 632 or program modules 634 may include, for example, computer program logic for implementing any one or more of (e.g., at least a portion of) the journey-based transfer-learning logic 108, the first DNN 110, the second DNN 112, the journey-based transfer-learning logic 408, the first DNN 410, the second DNN 412, the training logic 422, the weight transfer logic 424, the layer embedding logic 426, the weight initialization logic 428, the function application logic 430, the action logic 432, the entity changing logic 434, the presentation logic 436, the DNN 500, the first fully connected hidden layer 510, the linear layer 512, the non-linear activation layer 514, the dropout layer 516, the second fully connected hidden layer 520, the linear layer 522, the non-linear activation layer 524, the dropout layer 526, the output layer 530, the linear layer 532, the softmax layer 540, flowchart 200 (including any step of flowchart 200), and/or flowchart 300 (including any step of flowchart 300), as described herein.

A user may enter commands and information into the computer 600 through input devices such as keyboard 638 and pointing device 640. Other input devices (not shown) may include a microphone, joystick, game pad, satellite dish, scanner, touch screen, camera, accelerometer, gyroscope, or the like. These and other input devices are often connected to the processing unit 602 through a serial port interface 642 that is coupled to bus 606, but may be connected by other interfaces, such as a parallel port, game port, or a universal serial bus (USB).

A display device 644 (e.g., a monitor) is also connected to bus 606 via an interface, such as a video adapter 646. In addition to display device 644, computer 600 may include other peripheral output devices (not shown) such as speakers and printers.

Computer 600 is connected to a network 648 (e.g., the Internet) through a network interface or adapter 650, a modem 652, or other means for establishing communications over the network. Modem 652, which may be internal or external, is connected to bus 606 via serial port interface 642.

As used herein, the terms "computer program medium" and "computer-readable storage medium" are used to generally refer to media (e.g., non-transitory media) such as the hard disk associated with hard disk drive 614, removable magnetic disk 618, removable optical disk 622, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650 or serial port interface 642. Such computer programs, when executed or loaded by an application, enable computer 600 to implement features of embodiments discussed herein. Accordingly, such computer programs represent controllers of the computer 600.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

memory; and a processing system coupled to the memory, the processing system configured to:

train a first deep neural network, which is associated with a first set of actions that defines a first journey, by learning weights of nodes among layers of the first deep neural network that precede a final layer of the first deep neural network using structured data;

transfer the weights from the first deep neural network to corresponding nodes in a second deep neural network, which is associated with a second set of actions that defines a second journey, in accordance with a transfer-learning technique based at least on a similarity between the first set of actions and the second set of actions satisfying a similarity criterion;

add an embedding layer in lieu of the final layer of the first deep neural network in the second deep neural network such that an output of the embedding layer results in a same number of nodes as a pre-final layer of the first deep neural network;

initialize weights of the respective nodes in the embedding layer based at least on a probability that a new feature, which is associated with the second journey and which is not included among features in the structured data that are used to learn the weights in the first deep neural network, co-occurs with each of the features in the structured data;

apply a softmax function on a final layer of the second deep neural network, the softmax function configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique;

back-propagate a loss associated with the final layer of the second deep neural network to the embedding layer; and reduce the loss associated with the final layer of the second deep neural network by updating the weights of the respective nodes in the embedding layer based at least on the loss using the stochastic gradient descent technique to provide updated weights in the second deep neural network.

2. The system of claim 1, wherein the structured data comprises:

a plurality of device features, each device feature representing a respective attribute of a device that interacts with an entity associated with the first journey;

a plurality of entity features, each entity feature representing a respective attribute of the entity; and a plurality of interaction features, each interaction feature representing a respective attribute of an interaction between a device and the entity.

3. The system of claim 1, wherein the set of actions that defines the first journey is associated with a first software program;

wherein the set of actions that defines the second journey is associated with a second software program that is different from the first software program; and wherein the possible next actions include at least one of the following:

respective remedial actions regarding a technical issue associated with the second software program;

offering respective sets of terms regarding a purchase of the second software program; or presenting respective documents regarding the second software program via a user interface.

4. The system of claim 1, wherein the processing system is configured to:

transfer the weights from the first deep neural network to the corresponding nodes in the second deep neural network is performed as a result of a number of features that are associated with the second journey being different from a number of features that are associated with the first journey; and wherein the embedding layer maps the number of features that are associated with the second journey into the number of features that are associated with the first journey.

5. The system of claim 1, wherein the processing system is configured to:

add the embedding layer by concatenating the new feature from the second deep neural network with the features in the structured data that are used to learn the weights in the first deep neural network.

6. The system of claim 1, wherein the processing system is further configured to:

change an initial version of an entity that is associated with the second journey to provide a changed version of the entity;

cause the changed version of the entity to be presented in lieu of the initial version of the entity to a first subset of users who are associated with the second journey based at least on a prediction that presentation of the changed version to the users in the first subset is more likely than presentation of the initial version to the users in the first subset to cause the second journey for the users in the first subset to have a designated result; and cause the initial version of the entity to be presented to a second subset of the users who are associated with the second journey.

7. A method implemented by a computing system, the method comprising:

training a first deep neural network, which is associated with a first set of actions that defines a first journey, by learning weights of nodes among layers of the first deep neural network that precede a final layer of the first deep neural network using structured data;

transferring the weights from the first deep neural network to corresponding nodes in a second deep neural network, which is associated with a second set of actions that defines a second journey, in accordance with a transfer-learning technique based at least on a similarity between the first set of actions and the second set of actions satisfying a similarity criterion;

adding an embedding layer in lieu of the final layer of the first deep neural network in the second deep neural network such that an output of the embedding layer results in a same number of nodes as a pre-final layer of the first deep neural network;

initializing weights of the respective nodes in the embedding layer based at least on a probability that a new feature, which is associated with the second journey and which is not included among features in the structured data that are used to learn the weights in the first deep neural network, co-occurs with each of the features in the structured data;

applying a softmax function on a final layer of the second deep neural network, the softmax function configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique; and reducing a loss associated with the final layer of the second deep neural network by updating the weights of the respective nodes in the embedding layer based at least on the loss using the stochastic gradient descent technique to provide updated weights in the second deep neural network.

8. The system of claim 1, wherein the updated weights correspond to an updated probability distribution regarding the possible next actions to be performed in the second journey.

9. The system of claim 1, wherein the processing system is configured to:

execute the second deep neural network using the updated weights of the respective nodes in the embedding layer.

10. The method of claim 7, wherein the structured data comprises:

a plurality of device features, each device feature representing a respective attribute of a device that interacts with an entity associated with the first journey;

a plurality of entity features, each entity feature representing a respective attribute of the entity; and a plurality of interaction features, each interaction feature representing a respective attribute of an interaction between a device and the entity.

11. The method of claim 7, wherein the set of actions that defines the first journey is associated with a first software program;

wherein the set of actions that defines the second journey is associated with a second software program that is different from the first software program; and wherein the possible next actions include respective remedial actions regarding a technical issue associated with the second software program.

12. The method of claim 7, wherein the set of actions that defines the first journey is associated with a first software program;

wherein the set of actions that defines the second journey is associated with a second software program that is different from the first software program; and wherein the possible next actions include offering respective sets of terms regarding a purchase of the second software program.

13. The method of claim 7, wherein the set of actions that defines the first journey is associated with a first software program;

wherein the set of actions that defines the second journey is associated with a second software program that is different from the first software program; and wherein the possible next actions include presenting respective documents regarding the second software program via a user interface.

14. The method of claim 7, wherein transferring the weights from the first deep neural network to the corresponding nodes in the second deep neural network is performed as a result of a number of features that are associated with the second journey being different from a number of features that are associated with the first journey; and wherein the embedding layer maps the number of features that are associated with the second journey into the number of features that are associated with the first journey.

15. The method of claim 7, wherein adding the embedding layer comprises:

concatenating the new feature from the second deep neural network with the features in the structured data that are used to learn the weights in the first deep neural network.

16. The method of claim 7, further comprising:

changing an initial version of an entity that is associated with the second journey to provide a changed version of the entity;

causing the changed version of the entity to be presented in lieu of the initial version of the entity to a first subset of users who are associated with the second journey based at least on a prediction that presentation of the changed version to the users in the first subset is more likely than presentation of the initial version to the users in the first subset to cause the second journey for the users in the first subset to have a designated result; and causing the initial version of the entity to be presented to a second subset of the users who are associated with the second journey.

17. A computer program product comprising a computer-readable storage medium having instructions recorded thereon for enabling a processor-based system to perform operations, the operations comprising:

training a first deep neural network, which is associated with a first set of actions that defines a first journey, by learning weights of nodes among layers of the first deep neural network that precede a final layer of the first deep neural network using structured data;

transferring the weights from the first deep neural network to corresponding nodes in a second deep neural network, which is associated with a second set of actions that defines a second journey, in accordance with a transfer-learning technique based at least on a similarity between the first set of actions and the second set of actions satisfying a similarity criterion;

adding an embedding layer in lieu of the final layer of the first deep neural network in the second deep neural network such that an output of the embedding layer results in a same number of nodes as a pre-final layer of the first deep neural network;

initializing weights of the respective nodes in the embedding layer based at least on a probability that a new feature, which is associated with the second journey and which is not included among features in the structured data that are used to learn the weights in the first deep neural network, co-occurs with each of the features in the structured data;

applying a softmax function on a final layer of the second deep neural network, the softmax function configured to generate a probability distribution regarding possible next actions to be performed in the second journey based at least on the weights of the respective nodes in the embedding layer and further based at least on the weights of the respective nodes in the pre-final layer, which result from sequenced updating using a stochastic gradient descent technique; and reducing a loss associated with the final layer of the second deep neural network by updating the weights of the respective nodes in the embedding layer based at least on the loss to provide updated weights in the second deep neural network.

18. The computer program product of claim 17, wherein the structured data comprises:

a plurality of device features, each device feature representing a respective attribute of a device that interacts with an entity associated with the first journey;

a plurality of entity features, each entity feature representing a respective attribute of the entity; and a plurality of interaction features, each interaction feature representing a respective attribute of an interaction between a device and the entity.

19. The computer program product of claim 17, wherein the set of actions that defines the first journey is associated with a first software program;

wherein the set of actions that defines the second journey is associated with a second software program that is different from the first software program; and wherein the possible next actions include respective remedial actions regarding a technical issue associated with the second software program.

20. The computer program product of claim 17, wherein the set of actions that defines the first journey is associated with a first software program;

wherein the set of actions that defines the second journey is associated with a second software program that is different from the first software program; and wherein the possible next actions include offering respective sets of terms regarding a purchase of the second software program.

* * * * *